Nov. 1, 1955  J. H. ROBBINS  2,722,216
DEVICE FOR SELF-ADMINISTERING EYE MEDICINE
Filed Sept. 9, 1954  2 Sheets-Sheet 1
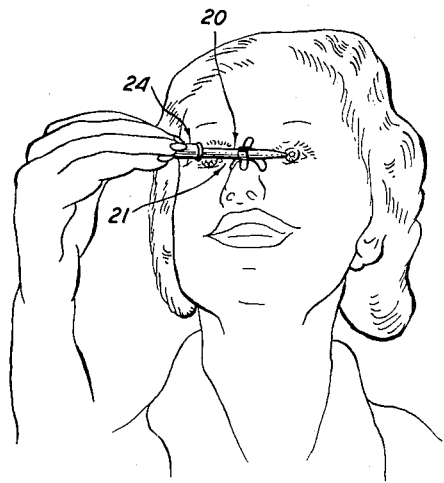
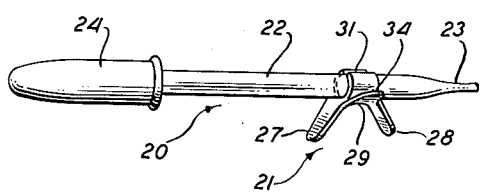
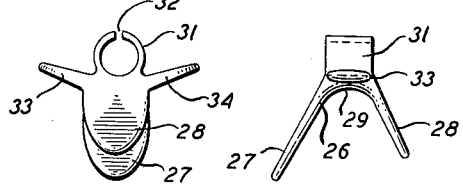
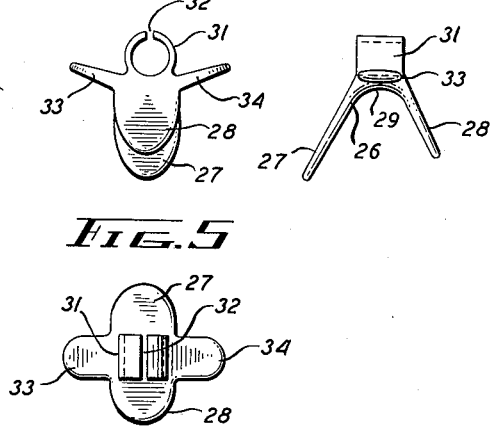
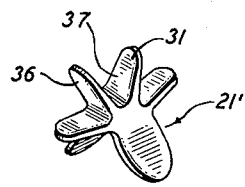
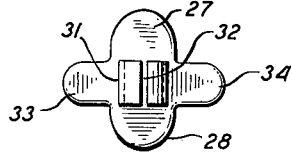
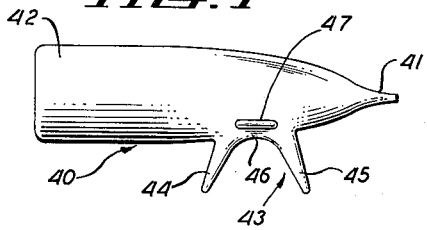
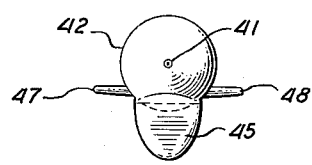
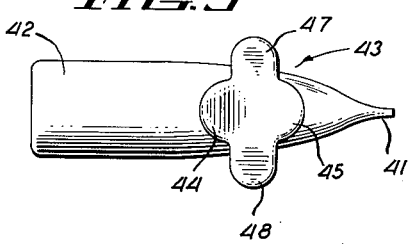
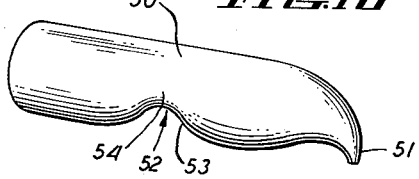
INVENTOR.
JAY HOWARD ROBBINS.
BY Mock & Blum
Attorneys.

Nov. 1, 1955    J. H. ROBBINS    2,722,216
DEVICE FOR SELF-ADMINISTERING EYE MEDICINE
Filed Sept. 9, 1954    2 Sheets—Sheet 2

INVENTOR.
JAY HOWARD ROBBINS.
BY
Attorneys.

United States Patent Office 2,722,216
Patented Nov. 1, 1955

2,722,216
DEVICE FOR SELF-ADMINISTERING EYE MEDICINE

Jay Howard Robbins, Woodmere, N. Y.

Application September 9, 1954, Serial No. 454,874

19 Claims. (Cl. 128—233)

This invention relates generally to medicine dispensing devices, and is particularly directed to such devices as are adapted to dispense or administer liquid medicine in drop or other form to the eye.

The particular embodiment of the present invention, which is illustrated in the drawings and which will be described hereinafter in greater detail, comprises generally a support adapted to straddle or rest on the nose of the user and firmly maintain an eye drop dispenser in operative position extending across the user's nose.

Heretofore, self-treatment of the eyes by means of drops was extremely difficult, if not impossible. Even the most skilled persons were incapable of administering drops to their own eyes, in the desired place, without spilling some liquid on the face or otherwise wasting medicine. While there have been previous devices intended to facilitate the self-administering of eye drops, such devices were cumbersome and awkward to operate, requiring both hands of the user, and obscuring the subject eye during the procedure. Further, it was not possible with these prior devices to administer the medicine at any selected location in the eye, but rather, it was frequently necessary to dispense sufficient liquid to bathe the entire eye to insure application to the desired point. In addition, prior devices of this general type required the outlet end or nozzle of an eye dropper to be in close proximity to and directed toward the eye, which increased the danger of injury to the eye upon inadvertent movement of the user.

Accordingly, it is a general object of the present invention to provide a device of the type described which overcomes the above mentioned difficulties, and simply and efficiently enables the administering of medicine in drop form into the eye of the operator. In particular, the device of the present invention permits one of only average skill and steadiness of hand to quickly, easily and accurately introduce drops into his own eyes, at any selected point therein, with complete safety and a minimum of spillage and waste.

It is a further object of the present invention to provide a medicine administering device having the advantageous characteristics indicated in the foregoing paragraph which is simple in construction, reliable in operation, durable in use, and which can be manufactured by mass production techniques for sale at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Fig. 1 is a perspective view showing a device of the present invention in operative condition;

Fig. 2 is a perspective view, somewhat enlarged, showing the device of Fig. 1 in asembly with an eye drop dispenser;

Fig. 3 is an end view showing the device of Fig. 2 removed from the dispenser;

Fig. 4 is a side elevational view of the device of Fig.3;

Fig. 5 is a top plan view showing the device of Fig. 3;

Fig. 6 is a perspective view showing a slightly modified form of device constructed in accordance with the present invention;

Fig. 7 is a side elevational view showing still another slightly modified form of the present invention;

Fig. 8 is a front end view showing the device of Fig. 7;

Fig. 9 is a bottom plan view showing the device of Fig. 7;

Fig. 10 is a perspective showing yet another slightly modified form of the present invention;

Figure 11:
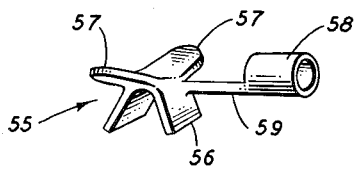
Fig. 11 is a perspective view showing a further modification of the present invention.

Referring now more particularly to the drawings, and specifically to Figs. 1–5 the embodiment of the invention illustrated therein comprises an eye drop dispenser, generally designated 20, and a guide, or support generally designated 21, adapted for attachment to the dispenser.

The eye drop dispenser 20, best seen in Fig. 2, may be conventional in construction, and includes a hollow tube 22 having one end 23 reduced in size and formed with an outlet opening, to define a nozzle. On the other end of the dispenser tube 22 is provided a flexible bulb 24, formed of rubber or the like, adapted to be manually squeezed for ejecting liquid from the tube outwardly through the nozzle 23.

The support attachment or guide 21 includes a supporting bridge or yoke 26 having a pair of downwardly diverging legs 27 and 28, which are connected together at their upper ends by a crest or bight portion 29. The bridge legs 27 and 28 may be of either equal or unequal length, as desired, within limits imposed by the average facial contours, and are preferably in alignment with each other, as best seen in Fig. 3, all for reasons which will presently become apparent.

Formed on the bridge crest, outwardly thereof, is a longitudinally split ring or annulus 31 defining a clip. That is, the annular member or clip 31 is arranged with its axis disposed longitudinally of the bridge or support 26, and has its uppermost portion formed with an open ended, through slot 32. The clip 31 is preferably afforded at least slight resiliency, which may be achieved by embedding a leaf spring (not shown) in the annulus, or by other suitable means.

Projecting laterally outwards from opposite sides of the bridge crest 29 are a pair of stabilizers or wings 33 and 34. As best seen in Figs. 3 and 5, the stabilizers or wings 33 and 34 incline outwards on opposite sides of the clip 31.

While the bridge 26, wings 33 and 34, and clip 31 are preferably formed as an integral unit, and may be fabricated of plastic or other suitable material, it is of course appreciated that the various parts of the guide 21 may be separably formed and fixedly secured together.

In operation, the dispenser 20 is inserted into the clip 31 where it is frictionally grasped and retained against inadvertent, longitudinal sliding movement. The assembled dispenser 20 and guide 21 are then arranged with the guide support or bridge 26 straddling the bridge of the user's nose, the support legs 27 and 28 being on opposite sides of the nose. If desired, the support legs may be somewhat resilient to releasably grip the nose. The unequal support leg length, see Fig. 4, will permit the clip 31 and dispenser 20 to be canted downwards toward the dispenser nozzle 23 for more reliable dispenser operation. That is, with the nozzle end of the dispenser at an elevation below that of the bulb end, a quantity of medicine will always be immediately available for discharge through the nozzle, and will be dispensed cleanly, without dripping along the tube 22. Of course, with support legs of equal length, the dispenser inclination may be achieved by fixing the clip at a slight angle with respect to the crest or bight portion 29 of the support 26.

With the assembly of Fig. 2 in position on the nose of the operator, as in Fig. 1, the dispenser 20 may be shifted longitudinally in the clip 31 until the nozzle end 23 is in alignment with that point of the eye to be medicated. That is, with the head tilted slightly back, the dispenser 20 may be slid in the clip 31 until the nozzle end 23 is directly over the desired eye portion, visual access to the dispenser nozzle end and eye being had either by direct observation or by looking in a mirror. Obviously proper positioning of the dispenser may be accomplished with one hand, the right hand in Fig. 1, leaving the other hand free for holding back the eye lid and performing other necessary functions.

While longitudinal displacement of the dispenser guide 21, in the direction of dispenser movement in the clip 31, is prevented by the straddling engagement of the yoke 26 with the bridge of the user's nose, lateral displacement of the guide and dispenser is prevented by the stabilizers or wings 33 and 34. More particularly, the wings or stabilizers extend along and engage with the ridge of the user's nose, so as to prevent sidewise rolling of the guide and other lateral displacement of the guide and dispenser. Thus, with the aid of the guide 21, the dispenser 20 may be adjusted longitudinally to any desired position, firmly maintained in the adjusted position and actuated to dispense one or more drops of medicine, all with only one hand of the operator. If it is desired to administer drops to both eyes, the dispenser and support may be removed from the face and reversed, as a unit, and the positioning procedure repeated.

In Fig. 6 is shown a slightly modified form of the present invention, wherein the guide or support 21' is substantially the same as the guide 21, with the exception of the clip 31' differing from the clip 31. That is, the clip 31' is of bifurcated, trough-like or V-shaped configuration, and includes a pair of upwardly diverging walls or legs 36 and 37 preferably having at least slight resiliency. The modification of Fig. 6 is substantially the same in operation as that described above in connection with Figs. 1–5, however, the dispenser tube 22 will require forced insertion between the clip legs 36 and 37 for frictional retention thereby. Stated otherwise, at any selected position of its longitudinal shifting movement, the dispenser 20 will be wedged between the clip legs 36 and 37, and thus releasably retained in its adjusted position. The clip may also be U-shaped, or of other suitable configuration, as desired.

In Figs. 7, 8 and 9 are shown a further modification of the present invention, wherein a somewhat bottle shaped eye drop dispenser 40 is formed on one end with a tapering, outlet neck or nozzle 41. The other dispenser end 42 may be relatively large for holding a substantial quantity of medicine. The dispenser 40 is preferably fabricated of yieldable, resilient material, such as polyethylene plastic or the like, thus serving both as a medicine container and drop dispenser.

Intermediate its ends, the dispenser 40 carries a depending longitudinally disposed supporting yoke or bridge 43, including a pair of outwardly diverging leg members 44 and 45, and an intermediate bridge crest or bight portion 46. In its preferred form, the bridge legs 44 and 45, and the connecting bight portion 46 are all formed integrally with the dispenser 40, however it is appreciated that the bridge 43 may be fabricated separately from the dispenser and secured to the latter; or, the legs may be formed independently of the dispenser and the bridge crest formed integrally with the dispenser, as desired.

In addition, a pair of opposed, laterally outwardly extending stabilizers or wings 47 and 48 are carried by the bridge crest portion 46. In other words, the stabilizers 47 and 48 extend laterally outwards from opposite sides of the crest portion 46, as best seen in Fig. 9.

The operation and use of the device of Figs. 7–9 is substantially the same as that described hereinbefore in connection with Figs. 1–5. While the embodiment illustrated in Figs. 7–9 does not permit of dispenser adjustment relative to the bridge 43, it is understood that suitable adjustment means, permitting longitudinal shifting movement of the squeeze type container-dispenser relative to the supporting bridge may be provided without departing from the spirit and scope of the present invention. When the dispenser 40 is in operative position on the person of the user, with the bridge 43 straddling the user's nose, the relatively wide dispenser end 42 will be tilted upwards away from the adjacent eye of the user, thereby effecting the desired downward tilting of the nozzle end 41. Rolling of the dispenser 40 on the ridge of the user's nose, and other lateral displacement of the dispenser, will be effectively restrained by engagement of the stabilizers or wings 47 and 48 with the nose ridge, as described hereinbefore.

In Fig. 10 is shown still another slightly modified form of the present invention, wherein an elongated container 50 is provided on one end with an outlet or nozzle 51. It will be noted that the nozzle extends transversely of the container for direction toward the eye being treated. However, the nozzle may be disposed longitudinally of the container if desired; and similarly, the nozzles of the heretofore described forms of the invention may be disposed either longitudinally or transversely, as desired.

Spaced intermediate its ends, the container 50 is formed with a transversely disposed indentation or recess 52. That is, the recess 52 opens transversely through the container 50, and defines a longitudinally extending yoke or bridge 53. The container recess 52 further provides stabilizer portions 54 extending laterally outwards from opposite sides of the crest of the bridge 53, so that the container is positionable astride the nose of the user with the bridge 53 and stabilizer portions 54 engageable with the user's person to firmly support the container in the same manner as set forth hereinbefore with respect to the previously described forms of the invention.

While the container 50 is preferably fabricated entirely or in part of yieldable, resilient material, so as to be operable by manual squeezing of the container, it is appreciated that a flexible bulb or other suitable actuating means may be equally well employed. Further, the container 50 may be provided with an air vent, so as to discharge drops when the vent is opened, in the manner of a simple pipette.

If desired, the containers 40 and 50 may be formed of separable parts, and thus admit of opening for refilling, cleaning and the like.

The modification of Fig. 11 is similar to that of Figs.

1-5, and includes a support attachment or guide, generally designated 55, having a bridge or yoke 56, and wings or stabilizers 57 extending laterally in opposite directions from the crest of the bridge. An eye dropper engaging clip 58 is illustrated as an open ended, cylindrical member extending longitudinally of the bridge 56 and spaced longitudinally from the latter. That is, the clip 58 is fixedly connected to and longitudinally offset from the crest of the bridge 56 by an arm 59. This offset clip construction has been found desirable when the guide is intended for attachment to various types of eye drop dispensers.

Figure 12:
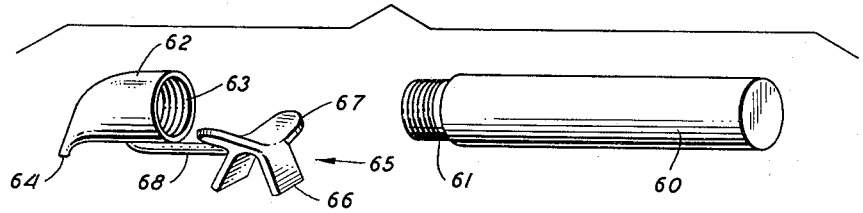
Fig. 12 is a perspective view showing a sectional dispenser constructed in accordance with the present invention, the sections thereof being illustrated in separated condition.

In Fig. 12 is shown another modification of the instant invention wherein the dispenser includes a container section 60 which may be a conventional bottle, either rigid or flexible, provided with external threads 61 extending about the bottle neck or opening. A cap or closure section 62 is adapted for engagement with the container section 60, as by internal screw threads 63, to close the container, and is provided with an outlet opening 64 to permit egress of liquid from the container. The cap 62 may be flexible, or yieldable and resilient to afford squeeze type operation for ejecting drops, or may be provided with an air vent (not shown), permitting of pipette-like operation. A guide or support, generally designated 65 includes a longitudinally disposed bridge or yoke 66 having lateral wings 67 extending outwards from opposite sides of the bridge crest, all for engagement with the person of the user, as described hereinbefore. The guide 65 is spaced longitudinally from the cap 62, and fixedly connected to the latter by the arm 68, so as to permit interchanging of the container 60 relative to the cap 62 without affecting the guide or support 65.

Figure 13:
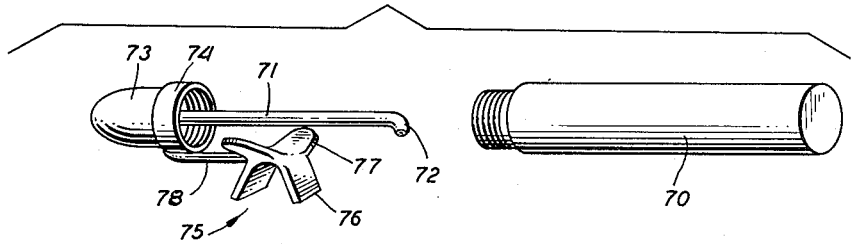
Fig. 13 is a perspective view showing still a further modification of the present invention, as incorporated with a combination eye dropper and container closure.

A further modification of the present invention is illustrated in Fig. 13 and comprises a container 70, which may be conventional, an eye dropper or dispenser 71 having an outlet opening 72 on one end and an actuating bulb 73 on the other end. The dispenser also includes a closure member or cap 74 fixed adjacent to the bulb 73 and engageable with the container 70 to fixedly support the dispenser 71 within the container. A dispenser guide or support 75, including a bridge or yoke 76 and laterally extending wings 77, is spaced longitudinally from the cap 74 and has the crest portion of its bridge fixedly connected to the cap by a longitudinally extending arm 78. Thus, the support 75 and arm 78 of Fig. 13 are substantially identical to the support 65 and arm 68 of Fig. 12, and are adapted to be placed upon the person of the user in substantially the same order.

While the dispenser guides or supports of the various embodiments described above have made reference to only a single pair of bridge legs and stabilizer wings, and only a single dispenser clip, it is of course understood that the number of bridge legs, stabilizer wings and clips may be varied without departing from the instant invention.

From the foregoing, it is seen that the present invention enables an operator to quickly, accurately and safely administer drops to his own eyes, and provides a device for the self-administering of eye drops which otherwise fully accomplishes its intended objects.

Although the present invention has been described in some detail by way of illustration and example for purposes of clarity of understanding, it is understood that certain changes and modifications, such as the employment of features of one disclosed form of the invention in connection with another form, may be made within the spirit of the invention and scope of the appended claims.

What is claimed is:

1. A device for self-administering eye drops, said device comprising a supporting bridge adapted to straddle the nose of the user, and an eye drop dispenser arranged longitudinally of and mounted on said bridge, said dispenser thus being firmly braced during operation for accurately dispensing drops to the eyes of the user.

2. A device according to claim 1, wherein said dispenser is longitudinally shiftable on said bridge, to permit adjustment of said dispenser over any desired portion of the eye.

3. A device according to claim 1, wherein said dispenser comprises a container fabricated of yieldable resilient material, said bridge being formed integrally with said container and snugly engageable with the user's nose.

4. A device according to claim 1, in combination with a pair of stabilizers extending laterally outwards from opposite sides of said bridge and engageable with the person of the user to prevent lateral displacement of said dispenser.

5. A device according to claim 4, wherein said bridge and stabilizers are defined by a recess formed in said dispenser.

6. A device according to claim 4, said stabilizers comprising a pair of opposed wings extending from the crest of said bridge.

7. A device according to claim 4, said dispenser including a container closure portion engageable with the neck of a container to close the latter and support said dispenser relative to said container.

8. In a device for self-administering eye drops, a bridge adapted to straddle the nose of the user, and a clip on the crest of said bridge for holding an eye drop dispenser longitudinally of said bridge, said dispenser thus being firmly braced during operation for accurately dispensing drops to the eye of the user.

9. A device according to claim 8, in combination with a pair of wings extending laterally oppositely from the crest of said bridge for engagement with the person of the user to prevent lateral displacement of said dispenser.

10. A device according to claim 8, said clip comprising an annular member arranged with its axis disposed longitudinally of said bridge for embracing engagement with said eye drop dispenser.

11. A device according to claim 8, said clip comprising a transversely disposed, bifurcated member adapted to frictionally retain said eye drop dispenser in position.

12. A device according to claim 8, wherein said dispenser is longitudinally shiftable on said bridge, to permit adjustment of said dispenser over any desired portion of the eye.

13. A device according to claim 8, wherein said clip is longitudinally offset from the crest of said bridge, to accommodate a wide variety of eye drop dispensers.

14. A device for self-administering eye drops, said device comprising an eye drop dispenser having an outlet opening, manually actuable operating means located on said dispenser for effecting discharge of drops through said outlet opening, and a longitudinally disposed supporting bridge carried by said dispenser intermediate the ends thereof, said supporting bridge being shaped to straddle the nose of the wearer for firmly bracing said dispenser in operative position extending across the wearer's nose.

15. A device according to claim 14, said dispenser comprising a container section for holding a supply of liquid, and a cap section having said outlet opening, said cap section being engageable with said container section to close the latter and permit the egress of liquid from said container section.

16. A device according to claim 14, in combination with a pair of opposed stabilizers extending laterally outwards from said supporting bridge and engageable with the person of the user to prevent lateral displacement of said dispenser.

17. A device according to claim 16, wherein said supporting bridge and stabilizers are defined by a recess formed in said dispenser.

18. A device for self-administering eye drops comprising an eye drop dispenser having an outlet opening, manually actuable means located on said dispenser for effecting discharge of drops through said outlet opening, a longitudinally disposed yoke depending from said dispenser and engageable over the nose of the user to support said dispenser in an operative position extending across the user's nose, and a pair of opposed wings extending laterally outwards from said yoke adjacent to said dispenser for engagement with the person of the user to prevent lateral displacement of said dispenser.

19. A device according to claim 18, said dispenser including a closure cap engageable over a container opening for closing the latter and supporting said dispenser in a container.

References Cited in the file of this patent
UNITED STATES PATENTS
2,676,592   Wood _____ Apr. 27, 1954